United States Patent
Matsui et al.

(10) Patent No.: US 8,687,053 B2
(45) Date of Patent: Apr. 1, 2014

(54) STEREOSCOPIC IMAGE DISPLAY DEVICE

(75) Inventors: Norihiro Matsui, Osaka (JP); Kazunori Yamada, Hyogo (JP)

(73) Assignee: Panasonic Corporation, Osaka (JP)

( * ) Notice: Subject to any disclaimer, the term of this patent is extended or adjusted under 35 U.S.C. 154(b) by 306 days.

(21) Appl. No.: 13/322,268

(22) PCT Filed: Jun. 25, 2010

(86) PCT No.: PCT/JP2010/004243
§ 371 (c)(1),
(2), (4) Date: Nov. 23, 2011

(87) PCT Pub. No.: WO2010/150554
PCT Pub. Date: Dec. 29, 2010

(65) Prior Publication Data
US 2012/0069159 A1  Mar. 22, 2012

(30) Foreign Application Priority Data
Jun. 26, 2009  (JP) .................. 2009-151948

(51) Int. Cl.
H04N 13/04 (2006.01)
H04N 13/02 (2006.01)
G09G 5/00 (2006.01)

(52) U.S. Cl.
USPC ................. 348/51; 348/42; 345/156

(58) Field of Classification Search
USPC ................. 348/42, 51; 345/156–157
See application file for complete search history.

(56) References Cited

U.S. PATENT DOCUMENTS
2007/0182730 A1*  8/2007  Mashitani et al. ............ 345/419

FOREIGN PATENT DOCUMENTS
JP 2001-326947 11/2001
JP 2004-194033 7/2004
JP 2004-354540 12/2004

OTHER PUBLICATIONS
International Search Report issued Sep. 14, 2010 in corresponding International Application No. PCT/JP2010/004243.

* cited by examiner

Primary Examiner — Dave Czekaj
Assistant Examiner — Tsion B Owens
(74) Attorney, Agent, or Firm — Wenderoth, Lind & Ponack, L.L.P.

(57) ABSTRACT

The present invention provides a stereoscopic image display device that improves visibility of a stereoscopic pointer image when the pointer position moves between objects in the stereoscopic image that have greatly different display depths. The display device changes the display depth of the stereoscopic pointer image in accordance with the display depth of an object in the stereoscopic image. When the pointer position moves between objects that have greatly different display depths from time t0 to time t1, the stereoscopic pointer image at time t1 is rendered so as to be perceived as having a display depth intermediate between the display depth of the stereoscopic pointer image at time t0 and the display depth of the display screen at the pointer position at t1. As a result, visibility of the stereoscopic pointer image is improved.

3 Claims, 10 Drawing Sheets

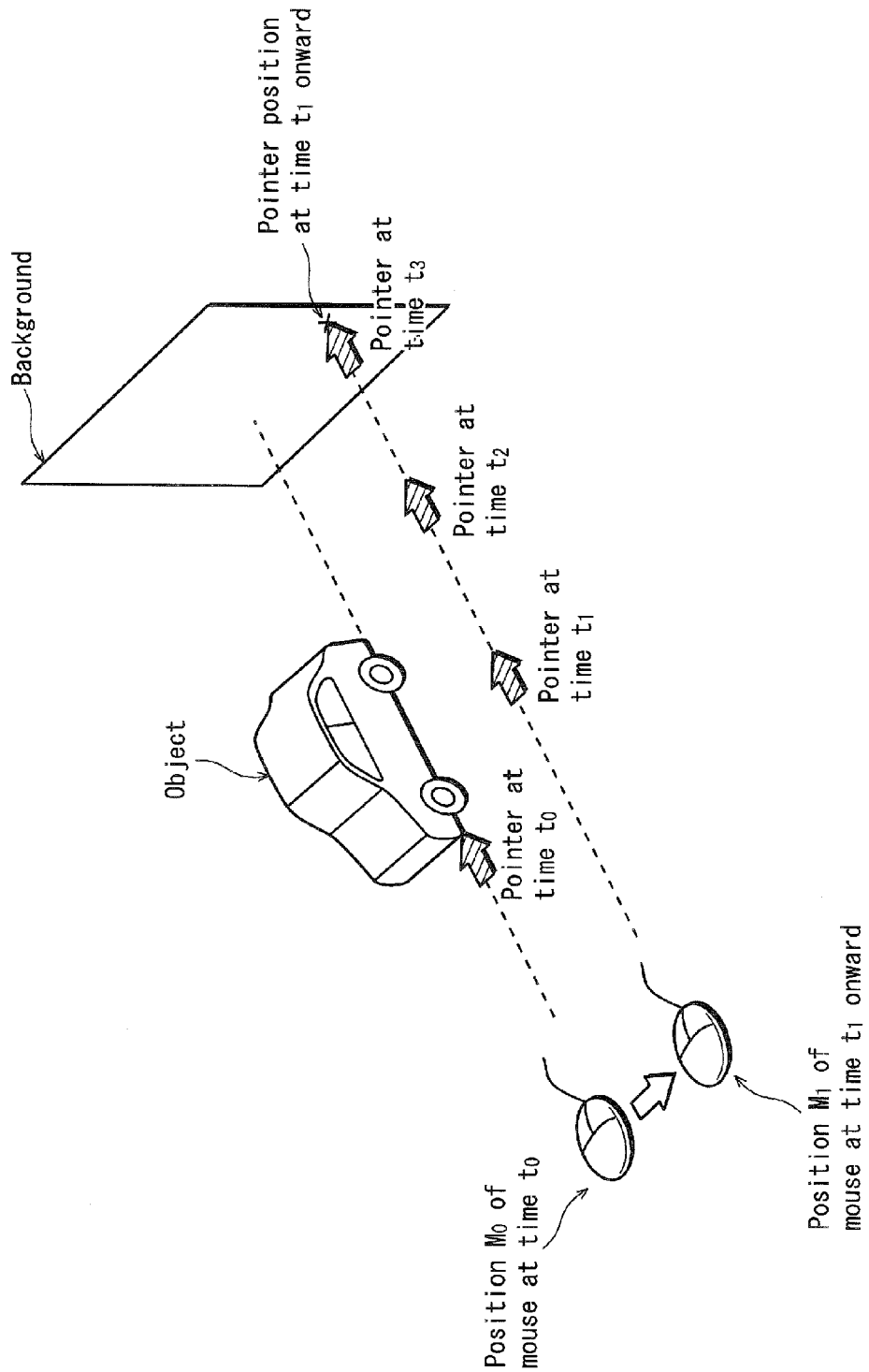

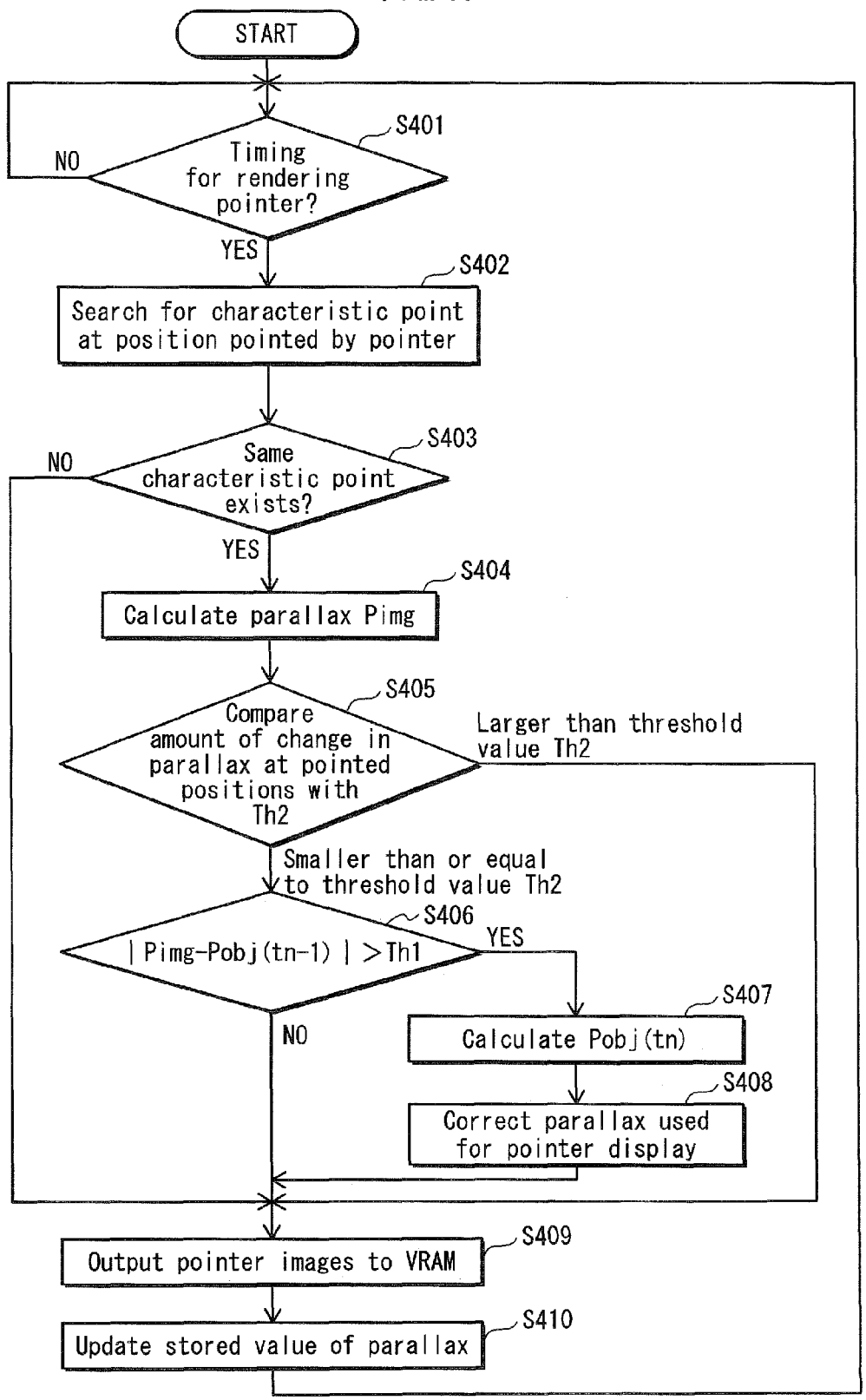

STEREOSCOPIC IMAGE DISPLAY DEVICE

TECHNICAL FIELD

The present invention relates to a stereoscopic image display device that generates a stereoscopic image from a plurality of images with parallax, and in particular to improvement in visibility.

BACKGROUND ART

One conventional technology for displaying a stereoscopic image is to prepare an image for the right eye (hereinafter "right-eye image") and an image for the left eye (hereinafter "left-eye image"), and then present the right-eye image and the left-eye image only to the right eye and the left eye, respectively. Here, the right-eye image and the left-eye image represent the fields of view of the right eye and the left eye, respectively. Such technology for displaying a stereoscopic image enables the user to experience 3D due to parallax, i.e., the amount of horizontal displacement between the right-eye image and the left-eye image, and is used in movies and the like to make objects look stereoscopic. With the dissemination of such technology, devices for editing captured stereoscopic images are expected to be used at home in the future.

In image editing, an image of a pointer (hereinafter "pointer image") may be displayed on a screen together with a stereoscopic image for the purpose of, for example, specifying an object in the stereoscopic image or specifying a display area. At this time, in order to enable more accurate pointing of an object, it is possible to display a pointer image in a stereoscopic manner by creating two pointer images with parallax, and composite the stereoscopic pointer image with the stereoscopic image. Here, if (i) the display depth of the stereoscopic pointer image is fixed and (ii) the display depth of an object pointed by the stereoscopic pointer image is different from the fixed display depth of the stereoscopic pointer image, the following visibility problem arises: the user sees double vision of the stereoscopic pointer image when focusing his/her eyes on the object, and double vision of the object when focusing his/her eyes on the stereoscopic pointer image. In view of the above problem, Patent Literature 1 discloses technology for correcting the display depth of a stereoscopic pointer image to match the display depth of an object pointed by the stereoscopic pointer image. The technology disclosed in Patent Literature 1 makes two pointer images that are to be composited with right-eye and left-eye images, respectively, demonstrate parallax in accordance with parallax of the stereoscopic image (i.e., the amount of displacement between the right-eye and left-eye images) at a pointer position to be pointed by the stereoscopic pointer image. As a result, the display depth of the stereoscopic image and the display depth of the stereoscopic pointer image match at the pointer position, and visibility is improved.

CITATION LIST

Patent Literature

Patent Literature 1

SUMMARY OF INVENTION

Technical Problem

According to the technology disclosed in Patent Literature 1, when the user attempts to move the pointer position on the stereoscopic image, if the pointer position moves between objects that show significantly different parallaxes, the parallax of the stereoscopic pointer image instantaneously changes to a great extent. By way of example, a movement of the pointer position between objects that show significantly different parallaxes can be observed when, from the viewpoint of the user who is looking at the stereoscopic image, the stereoscopic pointer moves from an object that looks very close to the user to an object that looks far from the user.

This gives rise to the problem that the user's eyes cannot adjust to the abrupt change in the parallax and fails to focus his/her eyes on the stereoscopic pointer image, thus impairing the visibility. The pointer position is indicated by using a pointing device such as a mouse. When the pointer position slightly moves by the unintentional, minute shaking of the user's hand, the stereoscopic pointer may move between objects that have greatly different display depths. Especially in this case, the depth of the stereoscopic pointer image changes without the user's intention. This makes the visibility problem prominent.

Furthermore, when the stereoscopic image constitutes video, even if the stereoscopic pointer is not in motion, the parallax of the stereoscopic pointer changes due to the movement of objects of the video displayed as a background of the stereoscopic pointer. This may lead to a significant change in the amount of parallax of the stereoscopic pointer.

The present invention aims to provide a stereoscopic image display device that improves visibility of a pointer object such as a pointer image when the pointer position moves between objects in a stereoscopic image that have greatly different display depths.

Solution to Problem

In order to achieve the above aim, a stereoscopic image display device pertaining to the present invention comprises: an image display unit configured to display a stereoscopic image on a display, the stereoscopic image being composed of a left-eye image and a right-eye image; an operation unit configured to receive a pointer position on a Cartesian coordinate system extending in parallel to a surface of the display; and a graphical user interface unit configured to composite, at a predetermined rendering rate, a pointer image with the stereoscopic image displayed on the display, the pointer image having a display depth in a direction perpendicular to the surface of the display, wherein when the display depth of the pointer image in a first rendering cycle is different from a display depth of the stereoscopic image in a second cycle immediately succeeding the first rendering cycle at the pointer position, the graphical user interface unit renders the pointer image in a plurality of consecutive rendering cycles starting with the second rendering cycle in such a manner that the display depth of the pointer image gradually changes from the display depth of the pointer image in the first rendering cycle and the display depth of the stereoscopic image in the second rendering cycle at the pointer position.

In general, the display depth of the stereoscopic pointer image and the display depth of the stereoscopic image at the pointer position are matched for the purpose of making it easy to visually recognize which object of the stereoscopic image is being pointed by the stereoscopic pointer image. However, this purpose can be achieved even when the display depth of the stereoscopic pointer image and the display depth of the stereoscopic image at the pointer position do not precisely match. For example, visual recognition of the position pointed by the stereoscopic pointer image is sufficiently possible when the stereoscopic pointer image is rendered with a display depth that makes the stereoscopic pointer image slightly pop out from the stereoscopic image that is actually pointed by the stereoscopic pointer image.

Therefore, the purpose of the present invention can be achieved even when the graphical user interface unit renders the stereoscopic pointer image in the second rendering cycle and the plurality of rendering cycles that immediately follow the second rendering cycle in such a manner that the display depth of the stereoscopic pointer image rendered in the last one of the plurality of rendering cycles does not precisely match the display depth of the stereoscopic image at the pointer position in the second rendering cycle.

Advantageous Effects of Invention

When the display depth of a stereoscopic image changes at a pointer position, the structure described in [Solution to Problem] changes the display depth of a stereoscopic pointer image over a plurality of rendering cycles until the display depth of the stereoscopic pointer matches the display depth of the stereoscopic image. As a result, even when there is a large difference between the display depth of a stereoscopic pointer image and the display depth of a stereoscopic image at a pointer position, the parallax of the stereoscopic pointer image does not instantaneously change to a great extent.

Therefore, the user can gaze at the stereoscopic pointer image without losing focus on the stereoscopic pointer image when the pointer position moves between objects in the stereoscopic image that have greatly different display depths. This improves the visibility of the stereoscopic pointer image composited with the stereoscopic image.

BRIEF DESCRIPTION OF DRAWINGS

FIG. 5 schematically illustrates the movement of a stereoscopic pointer image when a pointer position moves between objects in a stereoscopic image that have greatly different display depths.

FIG. 10 is a flowchart of pointer image display processing pertaining to Embodiment 2.

DESCRIPTION OF EMBODIMENTS

The following describes embodiments of a stereoscopic image display device pertaining to the present invention with reference to the accompanying drawings.

Embodiment 1

Figure 1:
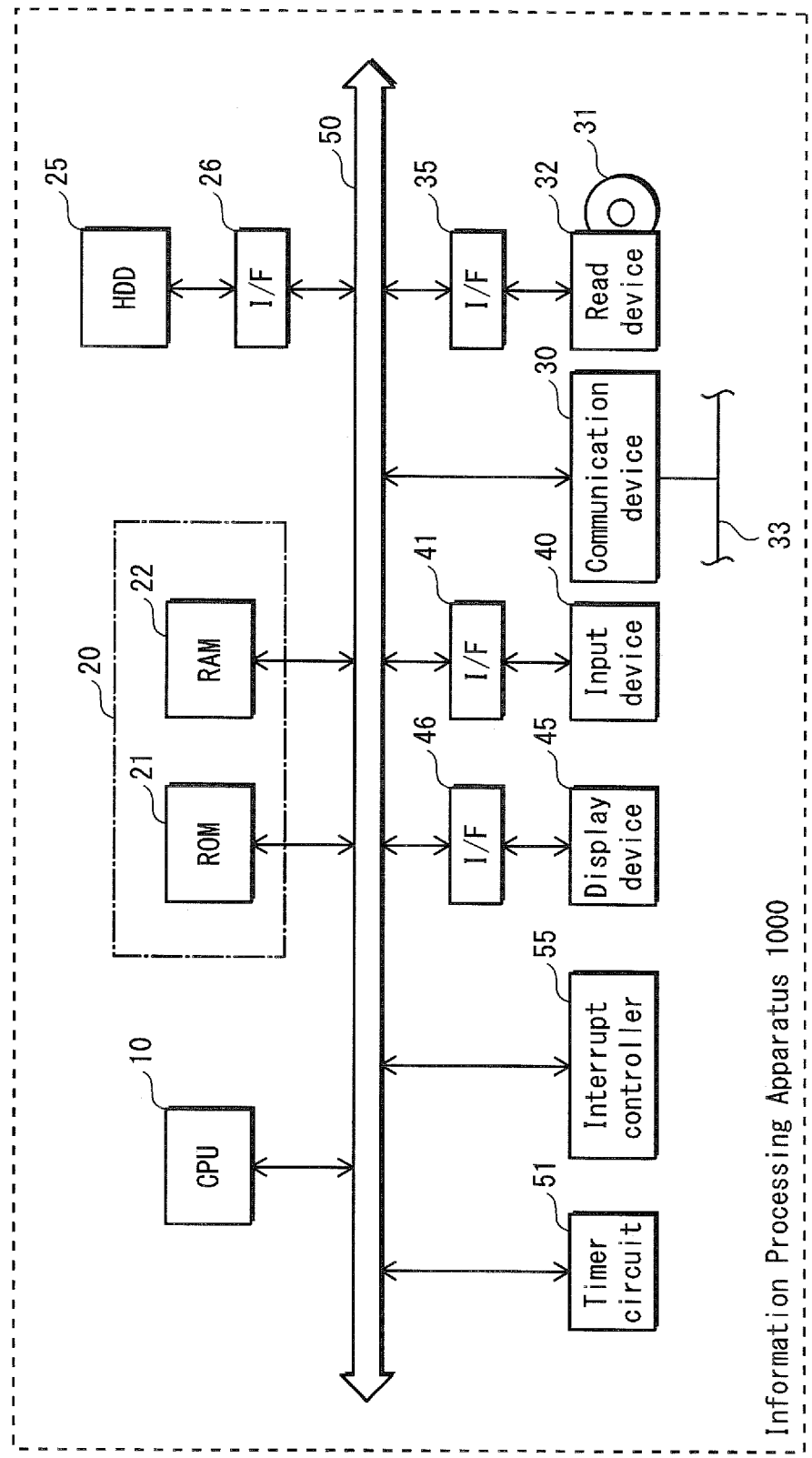
FIG. 1 shows a hardware structure of an information processing apparatus comprising a stereoscopic image display device pertaining to Embodiment 1.

FIG. 1 shows a hardware structure of an information processing apparatus comprising a stereoscopic image display device pertaining to Embodiment 1. This information processing apparatus 1000 can be provided to and used by a user as it is, but may be built in various types of electrical equipments. One example of the information processing apparatus 1000 is a general-purpose computer. A typical example of a general-purpose computer is a personal computer (PC). Alternatively, the information processing apparatus 1000 may be audio-visual (AV) equipment such as a television receiver and an AV playback apparatus, or may be a communication terminal such as a personal digital assistant (PDA) and a cell phone.

The information processing apparatus 1000 comprises a central processing unit (CPU) 10, a memory device 20, communication device 30, an input device 40, a display device 45, a timer circuit 51, and an interrupt controller 55. These constituent elements are connected to one another via a bus line 50. The bus line 50 can also be connected to a hard disk device 25 and a read device 32 as necessary. The hard disk device 25, the read device 32, the input device 40 and the display device 45 are connected to the bus line 50 via interfaces 26, 35, 41 and 46, respectively.

The CPU 10 may be a single CPU, or may be made up of a plurality of CPUs. FIG. 1 illustrates an example where the CPU 10 included in the information processing apparatus 1000 is a single CPU.

The memory device 20 is composed of read-only memory (ROM) 21 and random-access memory (RAM) 22. The ROM 21 stores thereon a computer program that defines the operations of the CPU 10 and data pieces. These computer program and data pieces may be stored in the hard disk device 25. The CPU 10 executes processing defined by the computer program while writing, into the RAM 22, the computer program and data pieces stored on the ROM 21 or the hard disk device 25 as necessary. The RAM 22 also functions as a medium that temporarily stores thereon data pieces that are generated in association with execution of processing by the CPU 10. The memory device 20 includes (i) nonvolatile writable memory that can retain contents stored therein even when the power is turned off (e.g., flash memory) and (ii) a recording medium.

The hard disk device 25 writes and reads the computer program or data pieces into and from a built-in hard disk (not illustrated).

The read device 32 reads the computer program or data pieces stored on a recording medium 31 (e.g., CD, DVD and memory card).

The communication device 30 exchanges the computer program or data pieces with the outside via a telecommunication line 33, examples of which include a telephone line, a network line, wireless communication, and infrared communication.

The input device 40 inputs data and the like in accordance with an operation by the user. Examples of the input device 40 include a keyboard arranged on a PDA, input buttons arranged on a cell phone, and attachable/detachable mouse and keyboard.

The display device 45 displays data, images, and the like on a screen, and outputs data and the like in the form of audio. Examples of the display device 45 include a liquid crystal display (LCD), a screen with cathode ray tubes, and a speaker.

The timer circuit 51 outputs a timer interrupt signal at a certain interval. The interrupt controller 55 relays, to the CPU 10, interrupt request signals transmitted from the timer circuit 51, the input device 40, the CPU 10, the communication device 30 (network device), the hard disk device 25, the read device 32, and the like. Priority levels are assigned to the interrupt requests transmitted from the respective devices. The interrupt controller 55 has a function to, when the interrupt requests are simultaneously issued by a plurality of devices, arbitrate the interrupt requests in accordance with the priority levels assigned to the interrupt requests.

As set forth above, the information processing apparatus 1000 is configured as a computer. The above computer program may be provided via the ROM 21, the hard disk device 25, a flexible disk (not illustrated) and the recording medium 31 (e.g., CD-ROM), or via a transmission medium such as a telecommunication line 33. For example, the computer program stored on the recording medium 31 (CD-ROM) can be read by connecting the read device 32 to the information processing apparatus 1000. Furthermore, the read computer program can be stored in the RAM 22 or the hard disk device 25.

When the computer program is provided from the ROM 21 (program recording medium), the CPU 10 can perform processing based on the computer program by loading the ROM 21 into the information processing apparatus 1000. The computer program provided via a transmission medium such as the telecommunication line 33 is received via the communication device 30 and stored into the RAM 22, the hard disk device 25, or the like. The transmission medium is not limited to a wired transmission medium, but may be a wireless transmission medium. Also, examples of the transmission medium include not only communication paths, but also a relay device (e.g., router) that relays communication in the communication paths.

Figure 2:
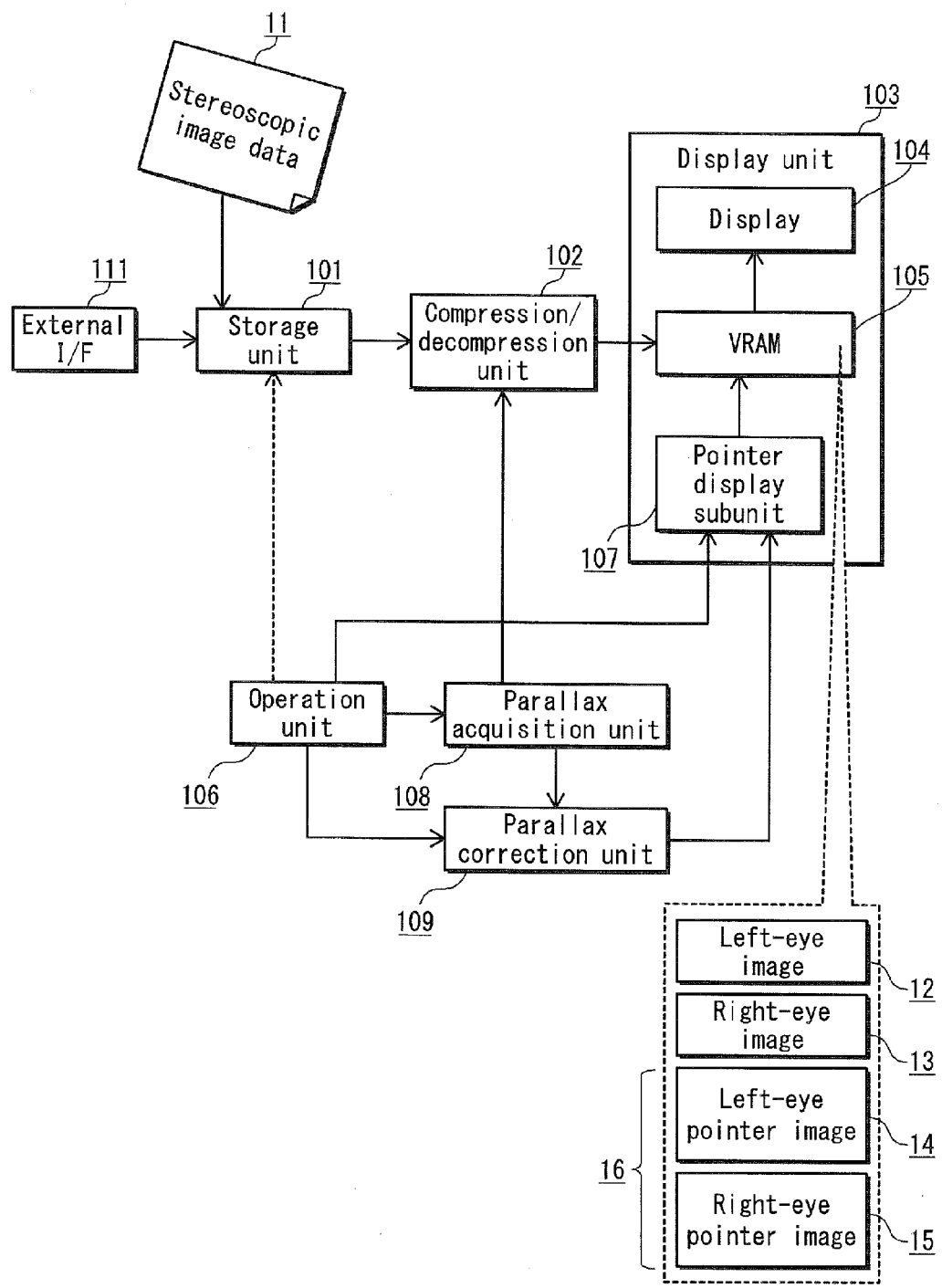
FIG. 2 is a block diagram showing the structure of the stereoscopic image display device.

The following describes the stereoscopic image display device. FIG. 2 is a block diagram showing the functional structure of the stereoscopic image display device pertaining to Embodiment 1.

Referring to FIG. 2, the stereoscopic image display device is composed of a storage unit 101, a compression/decompression unit 102, a display unit 103, an operation unit 106, a parallax acquisition unit 108, and a parallax correction unit 109.

The storage unit 101 temporarily stores therein stereoscopic image data 11 upon storage or playback of the stereoscopic image data 11. The storage unit 101 corresponds to the memory device 20 shown in FIG. 1. The stereoscopic image data 11 includes a left-eye image 12 and a right-eye image 13 that are respectively presented only to the left-eye and the right-eye of the user viewing a stereoscopic image. The left-eye image 12 and the right-eye image 13 may both be compressed in a certain format, a representative example of which is an MPEG format.

The compression/decompression unit 102, which functions as an image display unit, receives the stereoscopic image data 11 that has been compressed in a certain compression format, decompresses (converts) the stereoscopic image data 11 into a format that can be displayed by the display unit 103, and outputs the decompressed stereoscopic image data 11 to a video random-access memory (VRAM) 105. Representative examples of an image compression format include a JPEG format, a GIF format and a PNG format for still images, and an AVI format and an MPEG format for video. For example, in a case where the stereoscopic image data 11 includes two data pieces respectively obtained by compressing the left-eye image 12 and the right-eye image 13 in an MPEG format, the compression/decompression unit 102, which is an MPEG decoder, (i) decodes these two data pieces included in the stereoscopic image data 11 so as to convert them into the left-eye image 12 and the right-eye image 13 that are formatted to be output to the display unit 103 for display, and (ii) transfers the left-eye image 12 and the right-eye image 13 to the VRAM 105 on a per-frame basis.

Figure 3:
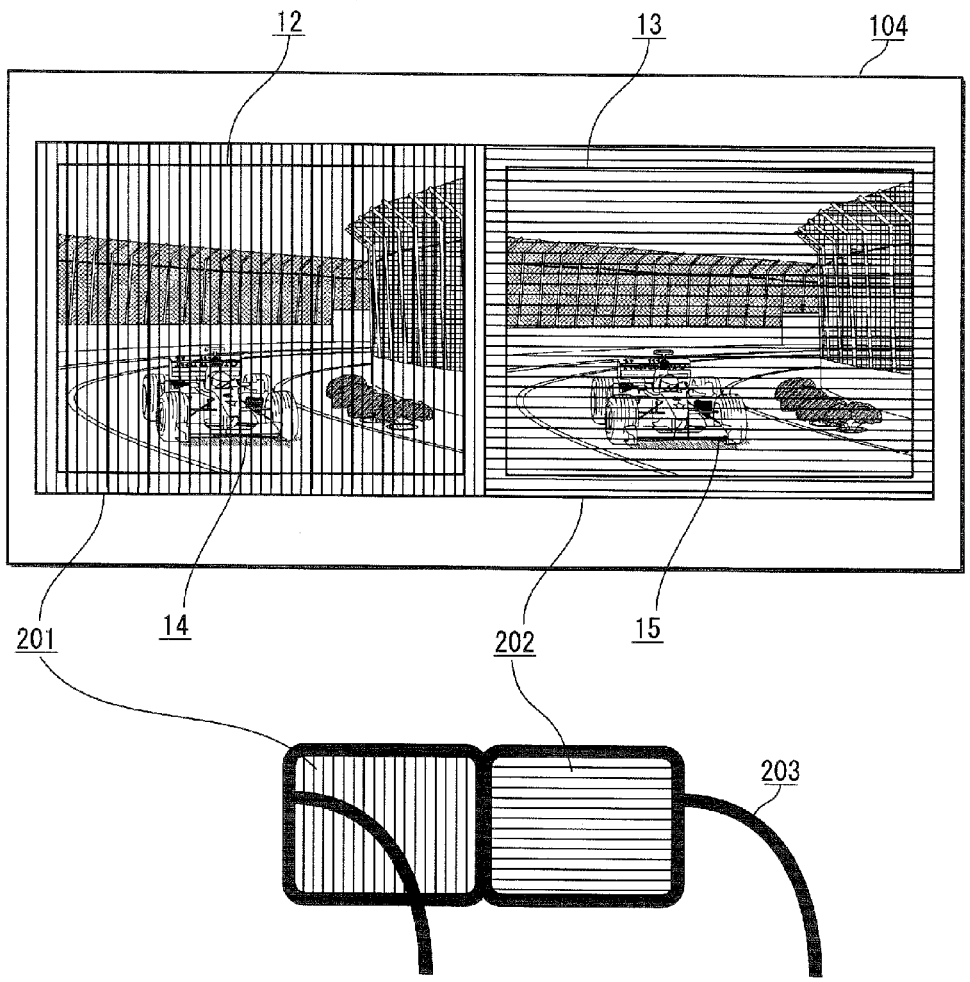
FIG. 3 shows one example of display of a stereoscopic image.
Figure 4:
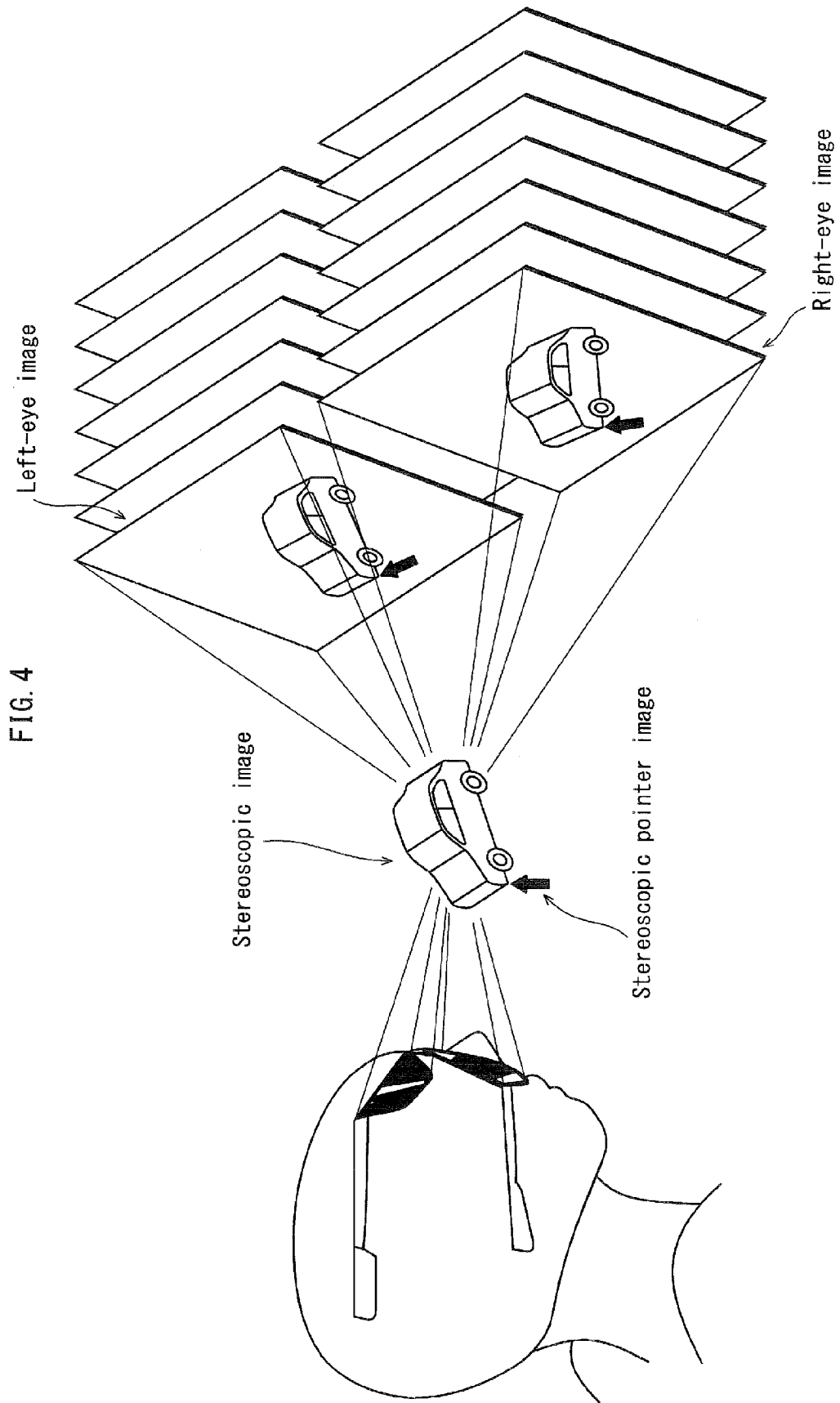
FIG. 4 shows another example of display of a stereoscopic image.

The display unit 103 includes a display 104, which is a screen for display, and the VRAM 105 that stores therein image information to be output to the display 104. The display unit 103 corresponds to the display device 45 shown in FIG. 1. The display unit 103 outputs the image information transferred to the VRAM 105 to the display 104 for display. Here, the display unit 103 displays the left-eye image 12 and the right-eye image 13 transferred to the VRAM 105 so the user perceives the left-eye image 12 and the right-eye image 13 as a stereoscopic image. One method to make the viewer perceive the left-eye image 12 and the right-eye image 13 as a stereoscopic image is to, for example, use polarizing filters illustrated in FIG. 3. With this method that uses the polarizing filters, the left-eye image 12 and the right-eye image 13 are displayed side by side (aligned horizontally) on the screen of the display 104. A polarizing filter 201 is attached to an area where the left-eye image 12 is displayed, and a polarizing filter 202 is attached to an area where the right-eye image 13 is displayed. Here, the polarization angle of the attached polarizing filter 201 is different from the polarization angle of the attached polarizing filter 202 by 90 degrees. The viewer views the left-eye image 12 and the right-eye image 13 with use of stereoscopic image viewing glasses 203. Two polarizing filters are respectively attached to the right-eye side and the left-eye side of the stereoscopic image viewing glasses 203. These two polarizing filters each have the same polarization angle as a corresponding one of the polarizing filters attached to the screen. As a result, the left eye and the right eye of the viewer perceive only the left-eye image 12 and the right-eye image 13, respectively. Due to the parallax created by these images, the viewer sees the left-eye image 12 and the right-eye image 13 as a stereoscopic image. The stereoscopic image viewing glasses 203 may further include refractive lenses that make it easier for the viewer to perceive the left-eye image 12 and the right-eye image 13. Another method to make the viewer perceive the left-eye image 12 and the right-eye image 13 as a stereoscopic image is a time-division method illustrated in FIG. 4. In this time-division method, right-eye images and left-eye images are alternately presented on the display, and the right-eye side and the left-eye side of the stereoscopic image viewing glasses are alternately switched between a light-transmissive state and a light-blocking state. This time-division method causes overlapping of a right-eye scene and a left-eye scene in the user's brain due to the afterimage effect. As a result, the user sees stereoscopic video on an extension of the center of his/her face.

The display unit 103 further includes a pointer display subunit 107. The pointer display subunit 107, together with the parallax acquisition unit 108 and the parallax correction unit 109, constitutes a graphical user interface unit. Based on the operation of the operation unit 106, the pointer display subunit 107 outputs pointer image information to the VRAM 105 so that a pointer image is output to the display 104 for display. The pointer display subunit 107 generates a left-eye pointer image 14 and a right-eye pointer image 15 and transfers them to the VRAM 105 so that the user perceives the pointer, too, as a stereoscopic image due to parallax in the same manner as the above-described display of a stereoscopic image. The pointer display subunit 107 also acquires parallax corrected by the parallax correction unit 109. The left-eye pointer image 14 and the right-eye pointer image 15 are generated so that the displayed stereoscopic pointer has the acquired parallax. The details of a method of correcting the parallax used in displaying the stereoscopic pointer will be described later.

The operation unit 106 inputs an operation made by the user with respect to a stereoscopic image editing device 10.

The operation unit 106 corresponds to the input device 40 shown in FIG. 1. The user inputs the details of the operation to the stereoscopic image display device with use of the operation unit 106 when selecting stereoscopic image data to be displayed and when issuing instructions regarding the stereoscopic image that has been output to the display 104 for display.

Based on the stereoscopic image that has been output for display, the parallax acquisition unit 108 acquires the amount of parallax created by the left-eye image 12 and the right-eye image 13 at the position indicated by the operation unit 106. The parallax acquisition unit 108 corresponds to the program that is stored in the storage device 20 and run by the CPU 10 shown in FIG. 1. The parallax acquisition unit 108 may be mounted as hardware. The details of a method of acquiring parallax will be described later.

The parallax correction unit 109 corrects the amount of parallax acquired by the parallax acquisition unit 108 to an amount of parallax to be actually used in displaying the pointer image, and instructs the pointer display subunit 107 to display the stereoscopic pointer image with the corrected amount of parallax. Upon correction of parallax, the parallax correction unit 109 calculates an intermediate parallax between the parallax of the stereoscopic pointer image currently being displayed and the parallax of the stereoscopic image acquired by the parallax acquisition unit 108. The parallax correction unit 109 regards the calculated intermediate parallax as corrected parallax. The details of a method of calculating the intermediate parallax will be described later. The above functions of the parallax correction unit 109 correspond to the program that is stored in the storage device 20 and run by the CPU 10 shown in FIG. 1. Alternatively, the above functions of the parallax correction unit 109 may be provided as hardware.

(Display of Pointer Images)

The following explains the movement of pointer images pertaining to the present invention with reference to FIGS. 5 and 6A to 6C. FIG. 5 schematically illustrates the movement of a stereoscopic pointer image when the pointer position moves between objects in a stereoscopic image that have greatly different display depths. As shown in FIG. 5, the stereoscopic image described here shows a car that pops out from the display screen when perceived by the user. Furthermore, in FIG. 5 time t0, time t1, time t2 and time t3 pass in the stated order.

Figure 6A:
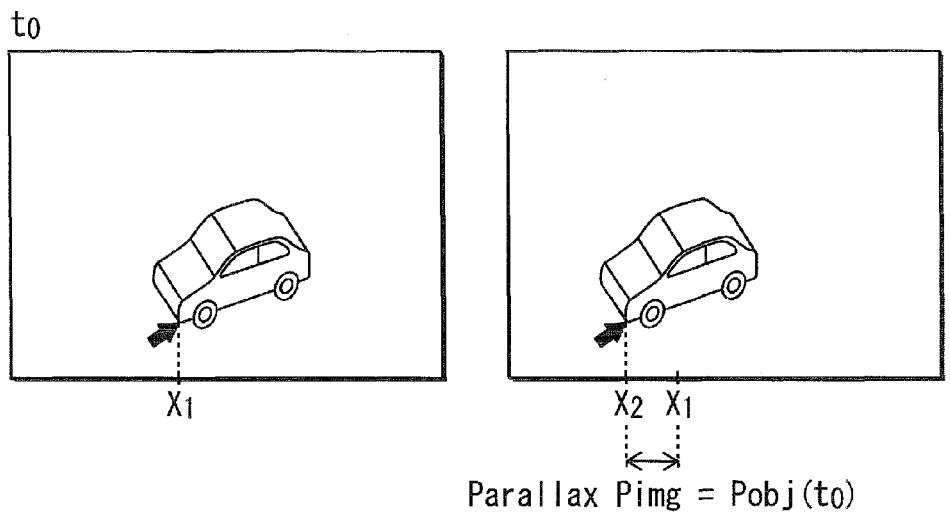
FIGS. 6A to 6C show coordinates at which a pointer image is rendered on the right-eye and left-eye images when a pointer position moves between objects that have greatly different display depths.

The mouse, which is an operating means, is positioned at a default position M0. At this time, the pointer position is at the front of the object, i.e., the car. FIG. 6A shows the left-eye image and the right-eye image with each of which the pointer image is composited at time t0. On the left-eye image, the pointer image is rendered in front of the car at a horizontal coordinate x1. On the right-eye image, the pointer image is rendered in front of the car at a horizontal coordinate x2. As described above, the parallax Pimg created by the right-eye and left-eye images at the front of the car, and the parallax Pobj(t0) created by the right-eye and left-eye pointer images, are both x1−x2. As a result, with the pointer position at time t0, the user perceives the stereoscopic pointer image as having the same display depth as the front of the car.

Figure 6B:
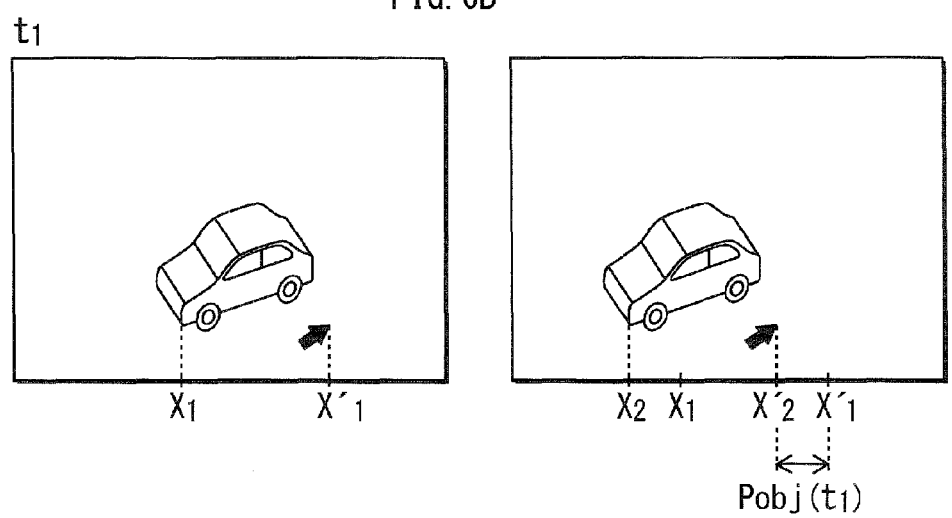

Here, when the mouse is moved at time t1 from the default position M0 to a position M1, which is to the right of the default position M0, as shown in FIG. 5, the pointer position moves to a point on the background that has the same display depth as the display screen. FIG. 6B shows a left-eye image and a right-eye image with each of which the pointer image is composited at time t1. In accordance with the movement of the pointer position, at time t1, the pointer image is composited with the left-eye image at a horizontal coordinate x1', and with the right-eye image at a horizontal coordinate x2'. At this time, the parallax Pobj(t1) of the stereoscopic pointer image is smaller than the parallax (i.e., x1−x2) of the front of the car pointed by the stereoscopic pointer image at time t0, and larger than the parallax (e.g., 0) of the background that has the same display depth as the display screen. Consequently, as shown in FIG. 5, the stereoscopic pointer image at time t1 is perceived by the viewer as having a display depth that is somewhere between the display depth of the stereoscopic pointer image at time t0 and the display depth of the display screen.

Figure 6C:
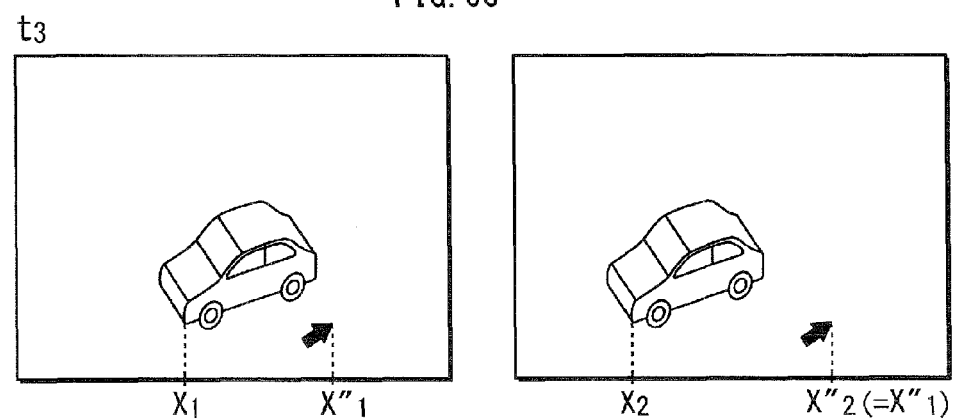

Thereafter, if the mouse does not move, i.e., if the pointer position does not change, the display depth of the stereoscopic pointer image is corrected to approach the display depth of the display screen (where the pointer position exists) at time t2, and is ultimately corrected to match the display depth of the stereoscopic image at the pointer position, namely, the display depth of the display screen, as shown in FIG. 5. FIG. 6C shows a left-eye image and a right-eye image with each of which the pointer image is composited at time t3. At time t3, the pointer image is composited with the left-eye image at a horizontal coordinate x1", and with the right-eye image at a horizontal coordinate x2". Here, x1" and x2" are the same horizontal coordinate, and the parallax Pobj(t3) of the left-eye and right-eye pointer images composited with the left-eye and right-eye images is 0.

Figure 7:
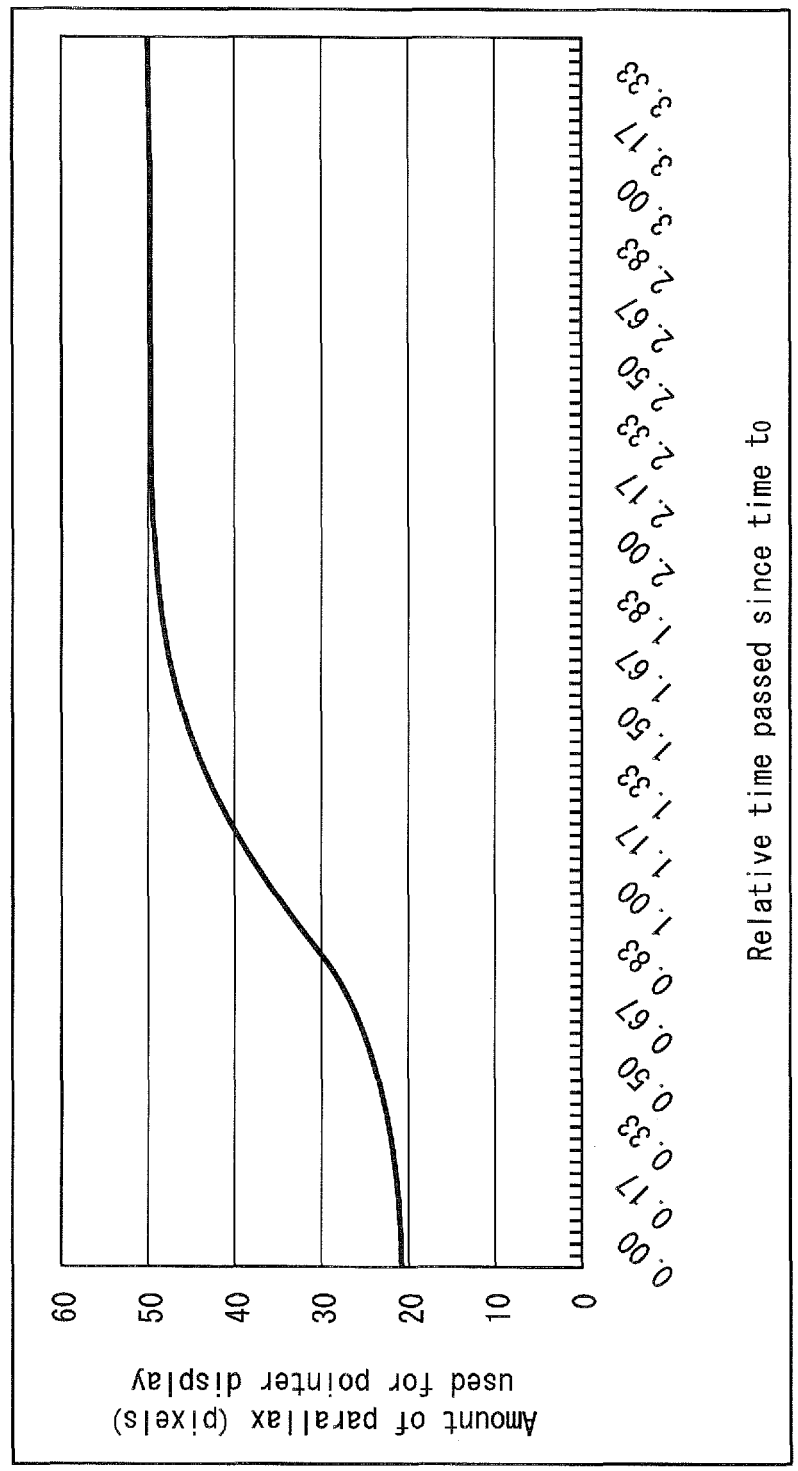
FIG. 7 shows a temporal change in parallax of the stereoscopic pointer image.

More specifically, by compositing a pointer image with left-eye and right-eye images while temporally changing the parallax as illustrated in FIG. 7, an abrupt change in the display depth of the stereoscopic pointer image is prevented. This makes it easy for the user to visually recognize the movement of the stereoscopic pointer image.

Figure 8:
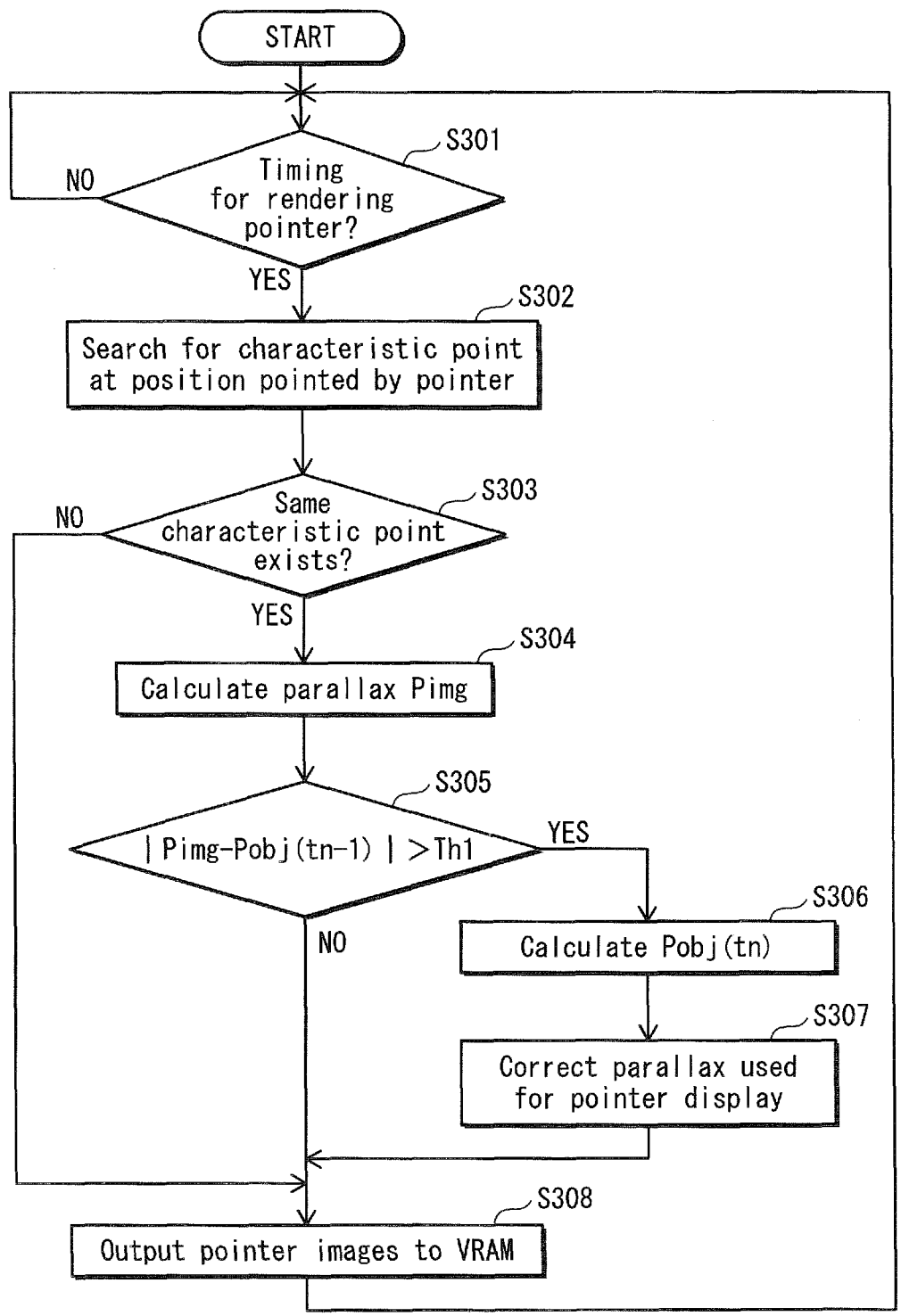
FIG. 8 is a flowchart of pointer image display processing.

Next, the following describes the flow of pointer image display processing pertaining to the present Embodiment 1 with reference to FIG. 8. FIG. 8 is a flowchart of the pointer image display processing pertaining to the present Embodiment 1 and performed by the stereoscopic image display device.

The pointer image display processing illustrated in the flowchart of FIG. 8 is performed while a stereoscopic image is being presented on the display. A stereoscopic image is displayed as follows. When the user selects, via the operation unit 106, stereoscopic image data 11 that he/she wants to output to the display 104, (i) the selected stereoscopic image data 11 is read from the storage unit 101, and (ii) the compression/decompression unit 102 decompresses (converts) the stereoscopic image data 11, which is in a compressed state, into a format that can be displayed by the display unit 103, and transfers the decompressed stereoscopic image data 11 to the VRAM 105.

In the pointer image display processing, at each timing for rendering a pointer image (the YES branch of step S301), the rendering cycle from step S302 through to step S308 is repeatedly performed. The timing for rendering a pointer image may be synchronized with the frame rate of the display device, or may occur once every few frames. Alternatively, a cycle for rendering a pointer image may be set while counting time with use of a timer.

Steps S302 to S304 are performed to calculate the parallax Pimg, which is created by portions of the left-eye image 12 and the right-eye image 13 corresponding to the pointer position designated upon execution of the current rendering cycle.

There are various methods for acquiring parallax. In one method described below, (i) a portion of the left-eye image and a portion of the right-eye image that have the same characteristic point are detected, (ii) the characteristic point from the left-eye image is compared with the characteristic point from the right-eye image, and (iii) a horizontal displacement between the two characteristic points is acquired as parallax. Generally, when the user performs an operation via the user operation unit 106 to display a stereoscopic pointer on the stereoscopic image that is being output on the screen, the operation unit 106 notifies the parallax acquisition unit 108 of information regarding the pointer position on a per-frame basis or the like. Each time the information is notified, the parallax acquisition unit 108 identifies coordinates of a portion pointed by a pointer on one of the left-eye image 12 and the right-eye image 13 that have been decompressed (converted) by the compression/decompression unit 102. Furthermore, the parallax acquisition unit 108 searches the other image for a portion that has the same characteristic point as the portion at the designated coordinates, and acquires coordinates of the portion searched in the other image. It should be noted here that typical examples of a method for searching for a portion having the same characteristic point include a pattern matching method, a template matching method, and a DP matching method. Any of these methods may be used. Alternatively, any method other than the above-listed methods may be used. If the stereoscopic image data 11 itself is formatted to include parallax information for each frame and each pixel ahead of time, the amount of parallax at the pointer position can be acquired in a more simplified manner.

The parallax acquisition unit 108 constantly performs the above processing to search for a characteristic point. After the search for the characteristic point, which is performed upon execution of processing of step S302, the result of the search is compared with another characteristic point in step S303. When the same characteristic point is detected from the left-eye image 12 and the right-eye image 13 (the YES branch of step S303), the parallax acquisition unit 108 calculates the parallax created by the objects at the positions pointed by the left-eye and right-eye pointers (step S304). More specifically, in a case where the viewer perceives the objects at the pointer positions with a display depth different from a display depth of the display screen, the result of the search for the characteristic point in step S302 indicates a horizontal displacement between relative coordinates of the pointer position on the left-eye image 12 and relative coordinates of the pointer position on the right-eye image 13. The parallax acquisition unit 108 acquires the amount of this displacement (i.e., the number of pixels that are horizontally displaced) as the parallax Pimg created by the objects at the positions pointed by the left-eye and right-eye pointers. On the other hand, when the same characteristic point is not detected from the left-eye image 12 and the right-eye image 13 (the NO branch of step S303), the processing moves to step S308. Thereafter, the pointer display subunit 107 composites the left-eye and right-eye pointer images on the same coordinates as the left-eye and right-eye pointer images displayed in the previous cycle, respectively.

After the parallax Pimg is acquired in step S304, the parallax correction unit 109 (i) calculates an absolute value of a difference between the acquired parallax Pimg and the parallax Pobj(tn−1) that was used in rendering the left-eye and right-eye pointer images in the previous cycle, and (ii) judges whether or not the calculated absolute value, namely the result of Pimg−Pobj(tn−1), is smaller than or equal to a predetermined threshold value Th1 (step S305). When the absolute value obtained by Pimg−Pobj(tn−1) is smaller than or equal to the predetermined threshold value Th1 (the NO branch of step S305), it is judged that there is no necessity to correct the parallax used in displaying the left-eye and right-eye pointer images, and the parallax correction unit parallax correction unit 109 notifies the pointer display subunit 107 to that effect. Thereafter, the processing moves to step S308. The pointer display subunit 107 provides the left-eye pointer image 14 and the right-eye pointer image 15 with the parallax Pimg, and composites the left-eye pointer image 14 and the right-eye pointer image 15 with the left-eye image 12 and the right-eye image 13, respectively. As a result, the display depth of the left-eye and right-eye pointer images matches the display depth of the objects at the pointer positions. Note that a value set as the threshold value Th1 should allow the user's eyes to, even when the parallax created by the left-eye and right-eye pointer images changes in one cycle, adopt to the amount of the change in the parallax. A suitable value for the threshold value Th1 is determined in accordance with the display size for the following reason. Even if the difference between the parallax Pimg and the parallax Pobj(tn−1) stays the same, the difference between the display depth of an object in the stereoscopic image and the display depth of the stereoscopic pointer image looks larger on a large-size display screen than on a small-size display screen. Therefore, the smaller the display size, the smaller the value used as the threshold value Th1.

On the other hand, when the absolute value obtained by Pimg−Pobj(tn−1) is larger than the predetermined threshold value Th1 in step S305 (the YES branch of step S305), the parallax correction unit 109 calculates the parallax Pobj(tn) to be used in the current cycle for rendering the left-eye and right-eye pointer images (step S306). Here, the parallax Pobj (tn) calculated by the parallax correction unit 109 is an intermediate parallax between the parallax Pimg created by the objects at the current pointer positions and the parallax Pobj (tn−1) created by the left-eye and right-eye pointer images in the previous cycle. By way of example, the intermediate parallax can be calculated using the following Expression 1.

Expression 1

$$P_{obj_{t_n}} = P_{obj} + (P_{img} - P_{obj}) \times \frac{\tanh\left(\frac{K}{T}t_n - S\right) + 1}{2} \qquad [\text{Math 1}]$$

In Expression 1, t0 indicates the time when the parallax created by the objects pointed by the left-eye and right-eye pointer images changes due to a change in the pointer positions or a change in the stereoscopic image. Pobj indicates the parallax created by the left-eye and right-eye pointer images at time t0. K/T is a constant that determines the amount of change in the parallax. The larger the value of K/T, the faster the change in the parallax. More specifically, a constant K determines the speed of change in the parallax, and a time period required for change in the parallax can be set as a variable T (e.g., "T seconds are required for the parallax to change from a default value Pobj to a terminal value Pimg"). S is a constant that determines a timing when the parallax is changed. The larger the value of S is, the sooner the large per-cycle change occurs in parallax. More specifically, when the constant S is large, the change in parallax becomes large toward time t0, which makes the sigmoid curve shown in FIG. 7 gentle. In contrast, when the constant S is small, the change in parallax becomes large with distance from time t0, which makes the sigmoid curve shown in FIG. 7 steep.

Any value may be set as each of the constants K and S and the variable T. By way of example, when K=2 and S=2, preferable effects can be achieved where the display depth of the stereoscopic pointer image changes smoothly and the stereoscopic pointer image is easily visible. More specifically, provided that a rendering rate (the frequency of update of the stereoscopic pointer image) is 30 fps, K=2, S=2, and the variable T=2 (i.e., it takes 2 seconds for the parallax to change), if the parallax Pobj created by the left-eye and right-eye pointer images at time t0 is 20 pixels and the parallax Pimg created by the objects at the pointer positions is 50 pixels, then Pobj(tn) changes as illustrated in the graph of FIG. 7.

The parallax correction unit 109 may be configured to (i) acquire the size or the screen resolution of a screen on which the stereoscopic image and the stereoscopic pointer image are displayed, and (ii) dynamically set the constants K and S and the variable T so as to change the timing to start correcting the parallax of the stereoscopic pointer image in accordance with the values of the acquired size or screen resolution. For example, on a screen where a change in parallax is prominent (e.g., a large-size screen and a low-resolution screen), large values may be set as S and T so as to suppress a change in the parallax of the stereoscopic pointer image. On the other hand, on a screen where a change in parallax is not prominent (e.g., a small-size screen and a high-resolution screen), small values may be set as S and T so as to cancel such suppression of a change in the parallax of the stereoscopic pointer image. This way, the visibility can be improved in accordance with the screen to which images are output. By determining the amount of change in the parallax of a stereoscopic pointer image based on the size or the screen resolution of the screen, the visibility can be improved in accordance with the screen to which images are output.

After calculating the parallax Pobj(tn) in step S306, the parallax correction unit 109 notifies the calculated parallax Pobj(tn) to the pointer display subunit 107. Upon notification of the parallax Pobj(tn), the pointer display subunit 107 determines the coordinates at which the left-eye and right-eye pointer images are to be composited with the left-eye and right-eye images, respectively, and corrects the left-eye and right-eye pointer images in step S307. For example, when the parallax Pimg is calculated in S304 with the position pointed by the left-eye pointer on the left-eye image 12 serving as a reference position, the Pobj(tn) indicates the number of pixels by which the right-eye pointer image to be composited with the right-eye image 13 will be horizontally shifted with respect to the reference position. Accordingly, the position of the left-eye pointer image 14 to be composited with the left-eye image 12 is corrected to the coordinates of the characteristic point on the left-eye image 12 searched in step S302. Similarly, the position of the right-eye pointer image 15 to be composited with the right-eye image 13 is corrected to the coordinates that are horizontally shifted by Pobj(tn) with respect to the coordinates of the left-eye pointer image 14. As a result, the stereoscopic pointer image is displayed with the parallax Pobj(tn). Here, if Pobj(tn) has a positive value, coordinates associated with the right-eye image 13 are horizontally shifted to the right with respect to coordinates associated with the left-eye image 12. If Pobj(tn) has a negative value, coordinates associated with the right-eye image 13 are horizontally shifted to the left with respect to coordinates associated with the left-eye image 12.

Finally, the pointer display subunit 107 composites the left-eye pointer image 14 with the left-eye image 12 in the VRAM, and composites the right-eye pointer image 15 with the right-eye image 13 in the VRAM (step S308). More specifically, after the parallax correction unit 109 corrects coordinates in step S307, the pointer display subunit 107 composites the corrected left-eye pointer image 14 and the corrected right-eye pointer image 15 with the left-eye image 12 and the right-eye image 13, respectively. This way, the stereoscopic pointer image displayed on the display 104 is perceived by the used at a display depth corresponding to the parallax Pobj(tn).

When there is a large difference between parallax created by left-eye and right-eye pointer images in the previous cycle and parallax created by objects in the stereoscopic image at the pointer positions in the current cycle, the above procedures can adapt the intermediate parallax between these two parallaxes to the left-eye and right-eye pointer images and display the left-eye and right-eye pointer images with the intermediate parallax in the current cycle.

Furthermore, by repeating such a cycle for rendering left-eye and right-eye pointer images on a per-frame basis or at a certain time interval, it is possible to realize an image presentation where the display depth of the left-eye and right-eye pointer images is gradually changed from a default value, eventually to the display depth of the objects at the pointer positions.

In other words, when the pointer position of a stereoscopic pointer moves from a first object in a stereoscopic image to a second object in the stereoscopic image that have greatly different display depths from each other, the display depth of the stereoscopic pointer image can be smoothly changed to the display depth of the second object while suppressing an abrupt change in the display depth of the stereoscopic pointer image. This can improve the visibility of the stereoscopic pointer image superimposed on the stereoscopic image.

Embodiment 2

Figure 9:
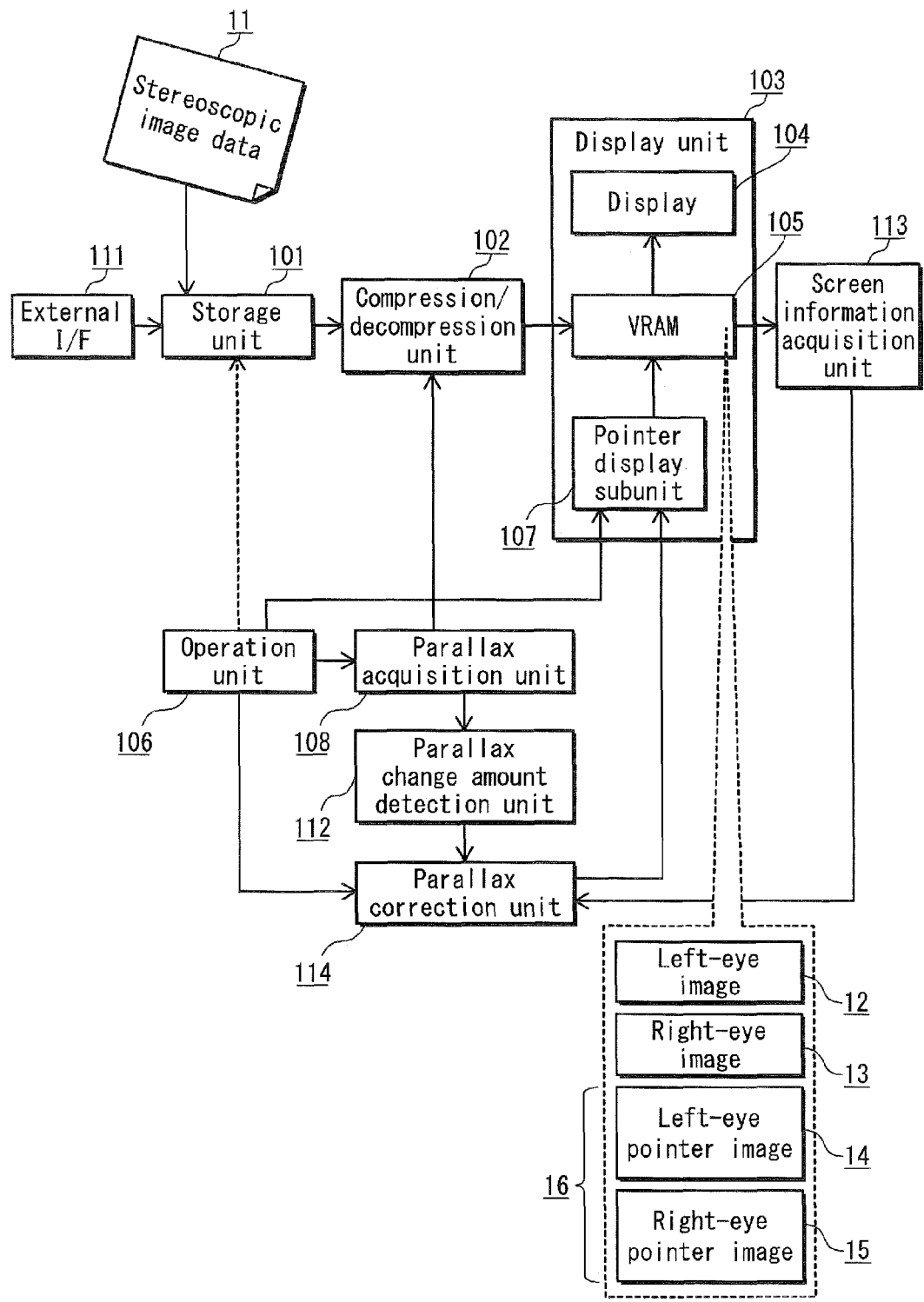
FIG. 9 is a block diagram showing the structure of a stereoscopic image display device pertaining to Embodiment 2.

FIG. 9 is a block diagram showing the functional structure of a stereoscopic image display device pertaining to Embodiment 2. The constituent elements shown in FIG. 9 that are the same as in the above-described FIG. 2 have the same numbers thereas, and are omitted from the following description.

As compared to the structure shown in FIG. 2, the stereoscopic image display device shown in FIG. 9 additionally includes a parallax change amount detection unit 112 and a screen information acquisition unit 113, and includes a parallax correction unit 114 in replacement of the parallax correction unit 109.

The parallax change amount detection unit 112 (i) acquires parallax Pimg(tn−1) of a stereoscopic image at a position pointed by a stereoscopic pointer, the parallax Pimg(tn−1) being calculated by the parallax acquisition unit 108, and (ii) holds the acquired parallax Pimg(tn−1) until the next processing cycle for rendering the left-eye and right-eye pointer images. In the next processing cycle, the parallax change amount detection unit 112 compares the value of the parallax Pimg(tn) acquired from the parallax acquisition unit 108 with the parallax Pimg(tn−1) being held. When the difference between the two compared parallaxes is smaller than or equal to a preset threshold value Th2, the parallax change amount detection unit 112 notifies the parallax correction unit 114 to change the parallax of the stereoscopic pointer image, and outputs the parallax Pimg(tn). On the other hand, when the difference between the two compared parallaxes is larger than the preset threshold value Th2, the parallax change amount detection unit 112 notifies the parallax correction unit 114 not to change the parallax of the stereoscopic pointer image. Furthermore, regardless of the result of the comparison, the parallax change amount detection unit 112 updates the value of the parallax being held to the value of the parallax Pimg(tn).

The screen information acquisition unit 113 acquires screen information that includes a screen size or a screen resolution of the display unit 103, and outputs the screen information in response to a request from the parallax correction unit 114. The screen information can be acquired by, for example, acquiring device information in a negotiation phase of HDMI connection.

The parallax correction unit 114 receives, from the parallax change amount detection unit 112, (i) a notification as to whether or not the parallax of the stereoscopic pointer image should be changed and (ii) the parallax Pimg(n) of the stereoscopic image at a position pointed by the stereoscopic pointer. When the received notification indicates that the parallax of the stereoscopic pointer image should be changed, the parallax correction unit 114 corrects the parallax to be actually used in displaying the stereoscopic pointer image with use of the value of the parallax Pimg(n) acquired from the parallax change amount detection unit 112. After correcting the parallax to be actually used in displaying the stereoscopic pointer image, the parallax correction unit 114 notifies the pointer display subunit 107 to display the stereoscopic pointer image with the corrected parallax. The parallax correction performed by the parallax correction unit 114 is as follows: the intermediate parallax between the parallax of the stereoscopic pointer image currently being displayed and the parallax of the stereoscopic image calculated by the parallax acquisition unit 108 is calculated; and the calculated intermediate parallax is regarded as the corrected amount of parallax. Note that the intermediate parallax is calculated using the same method as the one used by the parallax correction unit 109 described in Embodiment 1.

On the other hand, when the received notification indicates that the parallax of the stereoscopic pointer image should not be changed, the parallax correction unit 114 notifies the pointer display subunit 107 to use the value of the parallax of the stereoscopic pointer image currently being displayed for the parallax of the stereoscopic pointer image to be displayed in the next cycle.

Furthermore, the parallax correction unit 114 has a function to, when calculating the intermediate parallax to be used in displaying the stereoscopic pointer image, change the degree of correction made to the parallax of the stereoscopic pointer image in accordance with the screen size or the screen resolution acquired from the screen information acquisition unit 113. For example, in a case where the screen size is large (e.g., in the case of a large-size screen whose screen size exceeds 32 inches), the parallax correction unit 114 suppresses the amount of change in parallax per cycle so as to avoid an abrupt change in the display depth of the stereoscopic pointer image. On the other hand, in a case where the screen size is small (e.g., in the case of a small-size screen having a size of 32 inches or smaller), the parallax correction unit 114 increases the amount of change in parallax per cycle so as to clearly demonstrate a change in the display depth of the stereoscopic pointer image. This way, it is possible to display the stereoscopic pointer while changing its parallax suitably in accordance with the size and the screen resolution of the display screen. As a result, the visibility of the stereoscopic pointer is improved.

The following describes the flow of pointer image display processing pertaining to the present Embodiment 2 with reference to FIG. 10. FIG. 10 is a flowchart of the pointer image display processing pertaining to the present Embodiment 2 and performed by the stereoscopic image display device.

As compared to the flow of the processing described in Embodiment 1 with reference to FIG. 8, the flow of the processing shown in FIG. 10 is different in additionally including processing of steps S405 and S410. The following describes the differences between the pointer image display processing pertaining to Embodiment 1 and the pointer image display processing pertaining to Embodiment 2.

Step S405 is processing for comparing the difference between the parallax Pimg(tn) used in the current rendering cycle and the parallax Pimg(tn−1) used in the previous rendering cycle with the threshold value Th2. Step S410 is processing for updating the value of the parallax Pimg being held by the parallax change amount detection unit 112 to a value calculated in the current rendering cycle at the end of the current rendering cycle.

The details of step S405 is described blow. As described above, the parallax change amount detection unit 112 holds the parallax Pimg(tn−1) created by objects at the pointer positions, the parallax Pimg(tn−1) being calculated in the previous rendering cycle (steps S401 through S410). In step S405, the parallax change amount detection unit 112 compares, with the threshold value Th2, the difference (i.e., the amount of change) between the parallax Pimg(tn) calculated in step S404 in the current rendering cycle and the parallax Pimg(tn−1) used in the previous rendering cycle and being held. Here, the difference between the parallax Pimg(tn) used in the current rendering cycle and the parallax Pimg(tn−1) used in the previous rendering cycle indicates the amount of change in parallax of the stereoscopic image at a position pointed by a stereoscopic pointer. When the amount of change in parallax is smaller than or equal to the preset threshold value Th2 (the "Smaller than or equal to threshold value Th2" branch of step S405), the parallax change amount detection unit 112 notifies the parallax correction unit 114 that processing for correcting parallax should be performed, and the processing moves to step S406. On the other hand, when the amount of change in parallax is larger than the threshold value Th2 (the "Larger than threshold value Th2" branch of step S405), the parallax change amount detection unit 112 notifies the parallax correction unit 114 that the processing for correcting parallax should not be performed. In this case, the parallax correction unit 114 notifies the pointer image display subunit 107 to use the value of the parallax Pobj(tn−1) that was used in displaying the stereoscopic pointer image in the previous rendering cycle as-is for the parallax Pobj(tn) to be used in displaying the stereoscopic pointer image in the current rendering cycle. Thereafter, the processing moves to step S409. It is preferable that the threshold value Th2 be determined in accordance with a screen size and a screen resolution. For example, the following Expression 2 may be used.

$$Th2 = (e/2)/(\text{screen size/horizontal resolution}) \qquad \text{Expression 2}$$

In Expression 2, "e" denotes the distance between the user's eyes.

For example, in the case of a 50-inch full HD screen (with a horizontal resolution of 1920 pixels), provided that an average distance between human eyes is 6.5 cm, the threshold value Th2 is 68.18 pixels.

In the pointer image display processing pertaining to the present Embodiment 2, which includes the above-described procedures, the same parallax correction processing as in the pointer image display processing pertaining to Embodiment 1 is performed when the amount of change in the parallax Pimg of the stereoscopic image at a position pointed by the stereoscopic pointer is smaller than or equal to the threshold value Th2 between previous and current rendering cycles—i.e., when a change in the display depth of objects at the left-eye and right-eye pointer positions is suppressed to a certain extent between previous and current rendering cycles. As a result, the stereoscopic pointer image is rendered in such a manner that the display depth thereof changes smoothly. On the other hand, when the amount of change in the parallax Pimg between previous and current rendering cycles exceeds the threshold value Th2—i.e., when the display depth of objects at the left-eye and right-eye pointer positions largely changes between previous and current rendering cycles, the value of the parallax Pobj(tn−1) that was used in displaying the stereoscopic pointer image in the previous rendering cycle is used as-is to display the stereoscopic pointer image in the current rendering cycle. As a result, the stereoscopic pointer image is rendered in such a manner that the display depth thereof does not change between previous and current rendering cycles.

When the stereoscopic image constitutes video, there is a case where even if the stereoscopic pointer does not change in position, the stereoscopic pointer alternately points at different objects (object A and object B) in different frames. In such a case, there is a huge difference between the depths of the alternating objects A and B. In the above-described processing procedures, the parallax correction processing is not performed when this difference is larger than the threshold value Th2. This way, in a case where the stereoscopic pointer alternately indicates different objects A and B in different frames, the stereoscopic pointer is rendered without changing the depth thereof on a per-frame basis. It is therefore possible to reduce flickering of display of the stereoscopic pointer. This effect is prominent especially when the video constituted by stereoscopic images is blurry due to, for example, the motion of the hands of a camera operator during the video shoot.

(Notes)

The above has described the best embodiments that the applicant is aware of as of the filing date of the present application. It should be noted that further improvements and modifications may be made to the technical topics described below. It is optional to determine whether to realize the present invention as per the above embodiments, or with improvements and modifications made thereto. It is also up to the view of a person who embodies the present invention to make such determination.

(Configuration as System LSI)

The essential parts of the present invention are the structure shown in FIGS. 2 and 9. Of all the parts of the stereoscopic image display device, these essential parts may be extracted and configured as a system LSI.

A system LSI is created by mounting a bare chip on a high-density substrate and packaging the substrate. A system LSI can also be created by mounting a plurality of bare chips on a high-density substrate and packaging the substrate. In this case, the plurality of bare chips constitute a single LSI (such a system LSI is called a multi-tip module).

In the field of system LSIs, types of packaging include a quad flat package (QFP) and a pin grid array (PGA). A QFP is a system LSI with pins attached to the four sides of its package. A PGA is a system LSI with many pins attached to the entire bottom surface thereof.

These pins function as interfaces between the system LSI and other circuits. With the aid of such pins that function as the interfaces, the system LSI acts as a core of a playback device while these pins are connected to other circuits.

Such a system LSI can be build not only in a playback device but also in various types of devices that play back video, such as a TV, a game, a personal computer and a 1 seg cell phone. Hence, such a system LSI can widen the usage of the present invention to a great extent.

The following describes the details of a specific manufacturing procedure. First, based on the structural diagram explained in each embodiment explained above, a circuit diagram of the parts that constitute the system LSI is created. The constituent elements shown in the structural diagram are embodied with use of circuit elements, ICs, and LSIs.

The following are also defined as the constituent elements are embodied: (i) buses that connect between the circuit elements, ICs and LSIs; (ii) peripheral circuits; and (iii) interfaces that connect to the outside. Furthermore, connecting wires, power lines, ground lines, clock signal lines, and the like are also defined. The circuit diagram is completed after making adjustments to the above definitions (e.g., adjusting the operation timing for and guaranteeing a necessary bandwidth for each constituent element, in consideration of the specifications of the LSI).

Once the circuit diagram is completed, an implementation design is conducted. An implementation design is a task to create a substrate layout that determines where on the substrate the elements (circuit elements, ICs, and LSIs) shown in the circuit diagram created via a circuit design should be mounted, or how the connecting wires shown in the circuit diagram should be arranged on the substrate.

In the present description, the implementation design includes automatic mounting and automatic wire arrangement.

When a CAD device is used, the automatic mounting can be realized with a special-purpose algorithm called a "centroid method". In the automatic wire arrangement, the connecting wires that connect between pins, which are components shown in the circuit diagram, are defined with use of metallic foils and vias. When a CAD device is used, this wire arrangement process can be performed with special-purpose algorithms called a "maze method" and a "line search method".

Once the implementation design is thus conducted and the layout on the substrate is determined, the result of the implementation design is converted into CAM data and output to equipment such as an NC machine tool. Based on the CAM data, the NC machine tool performs system-on-a-chip (SoC) mounting, a system-in-a-package (SiP) mounting, and the like. The SoC mounting is a technique to print a plurality of circuits on a single chip. The SiP mounting is a technique to integrating a plurality of chips into a single package with use of resin and the like. Through the above procedure, a system LSI pertaining to the present invention can be created based on the internal structural diagram of a playback device described in each embodiment.

It should be noted that an integrated circuit created in the above-described manner may be referred to as an IC, an LSI, a super LSI, or an ultra LSI depending on the degree of integration.

In addition, a part or all of the constituent elements included in each playback device may be configured as a single chip. In addition, the method for forming integrated circuits is not limited to using the above-described SoC mounting and SiP mounting, but may be implemented with use of a dedicated circuit or a general-purpose processor. A field-programmable gate array (FPGA), which is programmable after the LSI is manufactured, or a reconfigurable processor, which allows reconfiguration of the connection and setting of circuit cells inside the LSI, may be used. Furthermore, if technology for forming integrated circuits that replaces LSIs emerges, owing to advances in semiconductor technology or to another derivative technology, function blocks may be formed as integrated circuits using such technology. The application of biotechnology or the like is possible.

(Program)

The present invention may be a method of executing an application disclosed by the processing procedures shown in the flowchart pertaining to each embodiment. Furthermore, the present invention may be a computer program including program codes that cause a computer to operate in accordance with such processing procedures, or may be a digital signal including the computer program. The control procedures described in the embodiments with reference to the flowcharts, as well as the control procedures conducted by functional constituent elements, are specifically realized with use of hardware resources. Although these control procedures are the creation of technical ideas utilizing natural laws, they satisfy conditions that are required to constitute the "invention of a program".

Furthermore, the present invention may be the above-described computer program or digital signal recorded on a computer-readable recording medium, such as a flexible disk, a hard disk, a CD-ROM, an MO, a DVD, a DVD-ROM, a DVD-RAM, a Blu-ray disc (BD), and a semiconductor memory.

The present invention may also be the above-described computer program or digital signal as transmitted via networks. Representative examples of the networks include telecommunications networks, wired/wireless communications networks, and the Internet.

Furthermore, another independent computer system may implement the above-described computer program or digital signal after the computer program or digital signal is transferred via being recorded on the recording medium, or via one of the above-mentioned networks or the like.

(External I/F)

Each of the stereoscopic image display devices described in the embodiments may further comprise an external I/F that acquires external data that is input from a USB, a network or a camera, or is acquired from an external recording medium. Each stereoscopic image display device may be configured to acquire the stereoscopic image data 11 via the external I/F and store the acquired stereoscopic image data 11 into the storage unit 101.

(Operation Unit)

The operation unit 106 may be any means that can input the details of an operation to a stereoscopic image display device. The operation unit 106 is not limited to being a keyboard or a mouse, but may be an input device integrated with the display 104. A representative example of such an input device is a display with a touchscreen.

The positional information used in displaying a pointer may be acquired using a method other than the methods described in the embodiments. Any method may be used as long as it can acquire information that identifies a position on a stereoscopic image. Other than being directly acquired from the operation unit 106, the positional information may be acquired in the following example method. In a case where the operation unit 106 is configured to provide the display unit 103 with the positional information used in displaying a pointer and the display unit 103 is configured to determine a position at which the pointer is actually displayed, the position at which the pointer is actually displayed may be acquired from the display unit 103.

(Correction in Parallax of Pointer Image)

In Embodiment 1, Expression 1 is described as an example of an expression with which the parallax of a stereoscopic pointer is corrected so it changes successively. However, a method and an expression utilized by the parallax correction for calculating an intermediate parallax may be other than the ones described above.

For example, an intermediate parallax may be calculated by using the following Expression 3. In Expression 3, Pobj(tn−1) denotes parallax of the stereoscopic pointer image used in the previous cycle, Pobj(tn) denotes parallax of the stereoscopic pointer image used in the current cycle, and Pimg denotes parallax of an object in a stereoscopic image at a position pointed by the current stereoscopic pointer.

$$Pobj(tn)=Pobj(tn-1)+[(Pimg-Pobj(tn-1))/k] \quad \text{Expression 3}$$

Here, k is a value that determines the rate of the amount of change in parallax. The larger the value of k, the larger the number of frames required until the parallax of the stereoscopic pointer matches the parallax of the object in the stereoscopic image at the position pointed by the stereoscopic pointer. A value that provides the user with an appropriate change in parallax is set to k. The brackets "[" and "]" are Gauss symbols and indicate "the maximum integer that does not exceed the value in the brackets "[" and "]". Expression 3 allows calculating the corrected parallax Pobj(tn) of the stereoscopic pointer image used in the current rendering cycle.

(Application to Small-Size Display)

The purpose of correction made to parallax of a stereoscopic pointer image as described in each embodiment is to suppress an abrupt change in the display depth of the stereoscopic pointer image. It should be noted that in a case where the size of a screen on which the stereoscopic pointer image is displayed is extremely small, the merit of correction made to parallax of the stereoscopic pointer is not prominent because a change in the depth perceived by the user is small even if a change in parallax is large.

In view of the above, in a case where the size of the screen is extremely small (e.g., 20 inches or less), it is permissible to (i) not execute processing of step S306 in FIG. 8 and processing of step S407 in FIG. 10, and (ii) render the left-eye and right-eye pointer images with parallax Pobj that has the same value as parallax Pimg of the objects at the left-eye and right-eye pointer positions.

(Display Depth of Pointer Image when Pointer Image Matches Objects)

In each embodiment, the display depth of the stereoscopic pointer image and the display depth of the stereoscopic image at the pointer position are matched for the purpose of making it easy to visually recognize which object of the stereoscopic image is being pointed by the stereoscopic pointer image. The user can visually recognize the distinction between the object in the stereoscopic image and the stereoscopic pointer by rendering a stereoscopic pointer image with a display depth that makes the stereoscopic pointer image slightly pop out from the stereoscopic image pointed by the stereoscopic pointer.

In view of the above, to enable an easy visual recognition of the distinction between the object in the stereoscopic image and the stereoscopic pointer, the stereoscopic pointer image may be rendered with parallax that makes the stereoscopic pointer image slightly pop out from the stereoscopic image at the pointer position. For example, when presenting the stereoscopic pointer image overlaid on the object in the stereoscopic image, the stereoscopic pointer image may be rendered with its parallax shifted from the parallax of the stereoscopic image at the pointer position by approximately 1 pixel, so that the stereoscopic pointer image pops out from the stereoscopic image at the pointer position. This clarifies the distinction between the object in the stereoscopic image and the stereoscopic pointer. At this time, the degree of the difference between parallax of the stereoscopic pointer image and parallax of the stereoscopic image at the pointer position should be in a range that enables a sufficient visual recognition of the object pointed by the stereoscopic pointer. An appropriate value for such a degree is determined in accordance with a screen size and a screen resolution. In other words, even when the difference between parallax of the stereoscopic pointer image and parallax of the stereoscopic image at the pointer position is constant, the larger the screen size, the wider the gap between the object in the stereoscopic image and the stereoscopic pointer when perceived by the user.

INDUSTRIAL APPLICABILITY

A stereoscopic image display device pertaining to the present invention is beneficial as an information processing device, AV equipment, or the like capable of pointing at an object in a stereoscopic image. The stereoscopic image display device pertaining to the present invention is also applicable to, for example, communication terminals such as PDAs and cell phones.

| [Reference Signs List] | |
| --- | --- |
| 10 | CPU |
| 20 | memory device |
| 21 | ROM |
| 22 | RAM |
| 25 | hard disk device |
| 26, 35, 41, 46 | interface |
| 30 | communication device |
| 31 | recording medium |
| 32 | read device |
| 33 | telecommunication line |
| 40 | input device |
| 45 | display device |
| 50 | bus line |
| 51 | timer circuit |
| 55 | interrupt controller |
| 11 | stereoscopic image data |
| 12 | left-eye image |
| 13 | right-eye image |
| 14 | left-eye pointer image (object-pointing image for the left eye) |
| 15 | right-eye pointer image (object-pointing image for the right eye) |
| 101 | storage unit |
| 102 | compression/decompression unit |
| 103 | display unit |
| 104 | display |
| 105 | VRAM |
| 106 | operation unit |
| 107 | pointer display subunit |
| 108 | parallax acquisition unit |
| 109, 114 | parallax correction unit |
| 111 | external I/F |
| 112 | parallax change amount detection unit |
| 113 | screen information acquisition unit |
| 201 | polarizing filter |
| 202 | polarizing filter whose polarization angle is different from the polarization angle of the polarizing filter 201 by 90 degrees. |
| 203 | stereoscopic image viewing glasses |

The invention claimed is:

1. A stereoscopic image display device comprising:
an image display unit configured to display stereoscopic video on a display, the stereoscopic video having a depth in a direction perpendicular to a surface of the display; and
a graphical user interface unit configured to composite a pointer image with the stereoscopic video displayed on the display so that the pointer image is displayed at a pointer position, the pointer image having a depth in the direction perpendicular to the surface of the display, the composition being performed at a predetermined rendering rate, wherein
when an amount of change from the depth of the stereoscopic video in a first rendering cycle at the pointer position to the depth of the stereoscopic video in a second rendering cycle immediately succeeding the first rendering cycle at the pointer position does not exceed a predetermined amount, the graphical user interface unit renders the pointer image in the second rendering cycle with an intermediate depth between the depth of the pointer image in the first rendering cycle and the depth of the stereoscopic video in the second rendering cycle at the pointer position, and
when the amount of change exceeds the predetermined amount, the graphical user interface unit renders the pointer image in the second rendering cycle with the depth of the pointer image in the first rendering cycle.

2. A semiconductor integrated circuit that performs stereoscopic image display processing, the semiconductor integrated circuit comprising:
an image display unit configured to display stereoscopic video on a display, the stereoscopic video having a depth in a direction perpendicular to a surface of the display; and
a graphical user interface unit configured to composite a pointer image with the stereoscopic video displayed on the display so that the pointer image is displayed at a pointer position, the pointer image having a depth in the direction perpendicular to the surface of the display, the composition being performed at a predetermined rendering rate, wherein
when an amount of change from the depth of the stereoscopic video in a first rendering cycle at the pointer position to the depth of the stereoscopic video in a second rendering cycle immediately succeeding the first rendering cycle at the pointer position does not exceed a predetermined amount, the graphical user interface unit renders the pointer image in the second rendering cycle with an intermediate depth between the depth of the pointer image in the first rendering cycle and the depth of the stereoscopic video in the second rendering cycle at the pointer position, and
when the amount of change exceeds the predetermined amount, the graphical user interface unit renders the pointer image in the second rendering cycle with the depth of the pointer image in the first rendering cycle.

3. A stereoscopic image display method comprising the steps of:
rendering stereoscopic video into video memory with which the stereoscopic video is displayed on a display, the stereoscopic video having a depth in a direction perpendicular to a surface of the display; and
compositing a pointer image with the stereoscopic video rendered into the video memory so that the pointer image is displayed at a pointer position, the pointer image having a depth in the direction perpendicular to the surface of the display, the composition being performed at a predetermined rendering rate, wherein
when an amount of change from the depth of the stereoscopic video in a first rendering cycle at the pointer position to the depth of the stereoscopic video in a second rendering cycle immediately succeeding the first rendering cycle at the pointer position does not exceed a predetermined amount, the compositing step renders the pointer image in the second rendering cycle with an intermediate depth between the depth of the pointer image in the first rendering cycle and the depth of the stereoscopic video in the second rendering cycle at the pointer position, and when the amount of change exceeds the predetermined amount, the compositing step renders the pointer image in the second rendering cycle with the depth of the pointer image in the first rendering cycle.

* * * * *